(12) United States Patent
Xiong et al.

(10) Patent No.: US 10,960,552 B2
(45) Date of Patent: Mar. 30, 2021

(54) FOOTED ROBOT LANDING CONTROL METHOD AND DEVICE

(71) Applicant: UBTECH Robotics Corp, Shenzhen (CN)

(72) Inventors: Youjun Xiong, Shenzhen (CN); Chunyu Chen, Shenzhen (CN); Yizhang Liu, Shenzhen (CN); Ligang Ge, Shenzhen (CN)

(73) Assignee: UBTECH ROBOTICS CORP, Shenzhen (CN)

(*) Notice: Subject to any disclaimer, the term of this patent is extended or adjusted under 35 U.S.C. 154(b) by 360 days.

(21) Appl. No.: 16/140,541

(22) Filed: Sep. 25, 2018

(65) Prior Publication Data
US 2019/0118385 A1 Apr. 25, 2019

(30) Foreign Application Priority Data
Oct. 23, 2017 (CN) .......................... 201710991598.9

(51) Int. Cl.
 B25J 17/00 (2006.01)
 B25J 13/08 (2006.01)
 B62D 57/032 (2006.01)

(52) U.S. Cl.
 CPC .......... *B25J 13/085* (2013.01); *B25J 13/088* (2013.01); *B25J 17/00* (2013.01); *B62D 57/032* (2013.01)

(58) Field of Classification Search
 CPC .... A61B 2562/0219; A61B 2562/0223; A61B 5/1114; A61B 5/112; A61B 5/1122;
(Continued)

(56) References Cited

U.S. PATENT DOCUMENTS 5,402,050 A * 3/1995 Ozawa ................. B62D 57/032
 180/8.6
5,644,204 A * 7/1997 Nagle .................. B62D 57/032
 318/568.12
(Continued)

FOREIGN PATENT DOCUMENTS

CN 104108433 A 10/2014

OTHER PUBLICATIONS

Xu et al., Force/Torque-based Compliance Control for Humanoid Robot to Compensate the Landing Impact Force, 2010, IEEE, p. 336-340 (Year: 2010).*
(Continued)

*Primary Examiner* — Mcdieunel Marc

(57) ABSTRACT

A footed robot landing control method and device are provided. The footed robot landing control method includes: detecting a landing motion state of the robot; if the landing motion state is a flight phase descending state, a motion of the foot portion of the robot with respect to a ground in the flight phase descending state is controlled based on a relative speed; if the landing motion state is a support phase landing state, a motion of joints of the robot in the support phase landing state is controlled based on a first expected joint torque. The footed robot landing control method and device are capable of reducing the impact of the foot portion against the ground, thereby realizing the flexible control of the landing process of the footed robot in a simple and rapid manner and reducing the cost of the footed robot.

16 Claims, 9 Drawing Sheets

(58) Field of Classification Search
CPC ..... A61B 5/224; A61B 5/4023; A61B 5/4076;
A61B 5/6831; B64C 2201/128; B64C
2201/141; B64C 2025/008; B64C
2201/027; B64C 2201/042; B64C
2201/088; B64C 2201/108; B64C
2201/123; B64C 2201/126; B64C
2201/127; B64C 2201/165; B64C
2201/18; B64C 25/32; B64C 27/08; B64C
39/024; G01C 22/006; G01C 21/00;
G01C 21/20; G05D 1/0676; G05D
1/0669; A47G 2029/146; A47G 2029/149;
A47G 29/122; A47G 29/141; A47G
29/30; B62D 57/032; G06Q 50/28; B25J
13/085; B25J 13/088; B25J 17/00; B64D
1/18
See application file for complete search history.

(56) References Cited

U.S. PATENT DOCUMENTS

| | | | | |
|---|---|---|---|---|
| 5,838,130 | A * | 11/1998 | Ozawa | B62D 57/02 318/568.2 |
| 7,308,335 | B2 * | 12/2007 | Takenaka | B62D 57/02 318/568.1 |
| 7,319,917 | B2 * | 1/2008 | Takenaka | B62D 57/02 318/568.1 |
| 7,319,919 | B2 * | 1/2008 | Takenaka | B25J 13/085 180/8.1 |
| 7,366,587 | B2 * | 4/2008 | Iribe | B62D 57/032 180/8.1 |
| 7,487,011 | B2 * | 2/2009 | Takenaka | B62D 57/02 318/568.12 |
| 7,496,428 | B2 * | 2/2009 | Takenaka | B62D 57/02 318/568.1 |
| 8,014,896 | B2 * | 9/2011 | Takenaka | B62D 57/032 700/245 |
| 8,793,019 | B2 * | 7/2014 | Yoshiike | B25J 9/0006 700/253 |
| 8,892,257 | B2 * | 11/2014 | Roh | B62D 57/032 700/258 |
| 2005/0171635 | A1 * | 8/2005 | Furuta | B62D 57/032 700/245 |

OTHER PUBLICATIONS

Luo et al., Impedance and Force Compliant Control for Bipedal Robot Walking on Uneven Terrain, 2015, IEEE, p. 228-233 (Year: 2015).*

Morisawa et al., Reactive biped walking control for a collision of a swinging foot on uneven terrain, 2011, IEEE, p. 768-773 (Year: 2011).*

Wan et al., Landing Motion of a Legged Robot with Impact Force Reduction and Joint Torque Minimization, 2013, IEEE, p. 259-264 (Year: 2013).*

Position-posture Control and Gait Planning of Six-legged Walking Robot, Gang Chen, China Doctoral Dissertations Full-text Database, Information Science and Thecnology , pp. 40-87, Feb. 2015.

* cited by examiner

FOOTED ROBOT LANDING CONTROL METHOD AND DEVICE

CROSS REFERENCE TO RELATED APPLICATIONS

This application claims priority to Chinese Patent Application No. 201710991598.9, filed Oct. 23, 2017, which is hereby incorporated by reference herein as if set forth in its entirety.

BACKGROUND

1. Technical Field

The present disclosure relates to robot technology, and particularly to a footed robot landing control method and device.

2. Description of Related Art

During the motion of a footed robot, a foot portion of the footed robot will have a greater impact with respect to the ground, the problem of reducing the impact of the foot portion against the ground so as to reduce the damage to the body portion which is caused by the impact has become an important part for the development of footed robots.

At present, the conventional method for reducing the impact of the foot portion against the ground is mainly implemented by designing a good planned curve through inverse kinematics planning so as to drive the footed robot. However, the method has higher requirements on the accuracy of the planned curve and the driving performance of the robot, which increases the cost of the footed robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

For the purpose of describing the technical solutions of the present disclosure, the following describes through specific embodiments.

Figure 1:
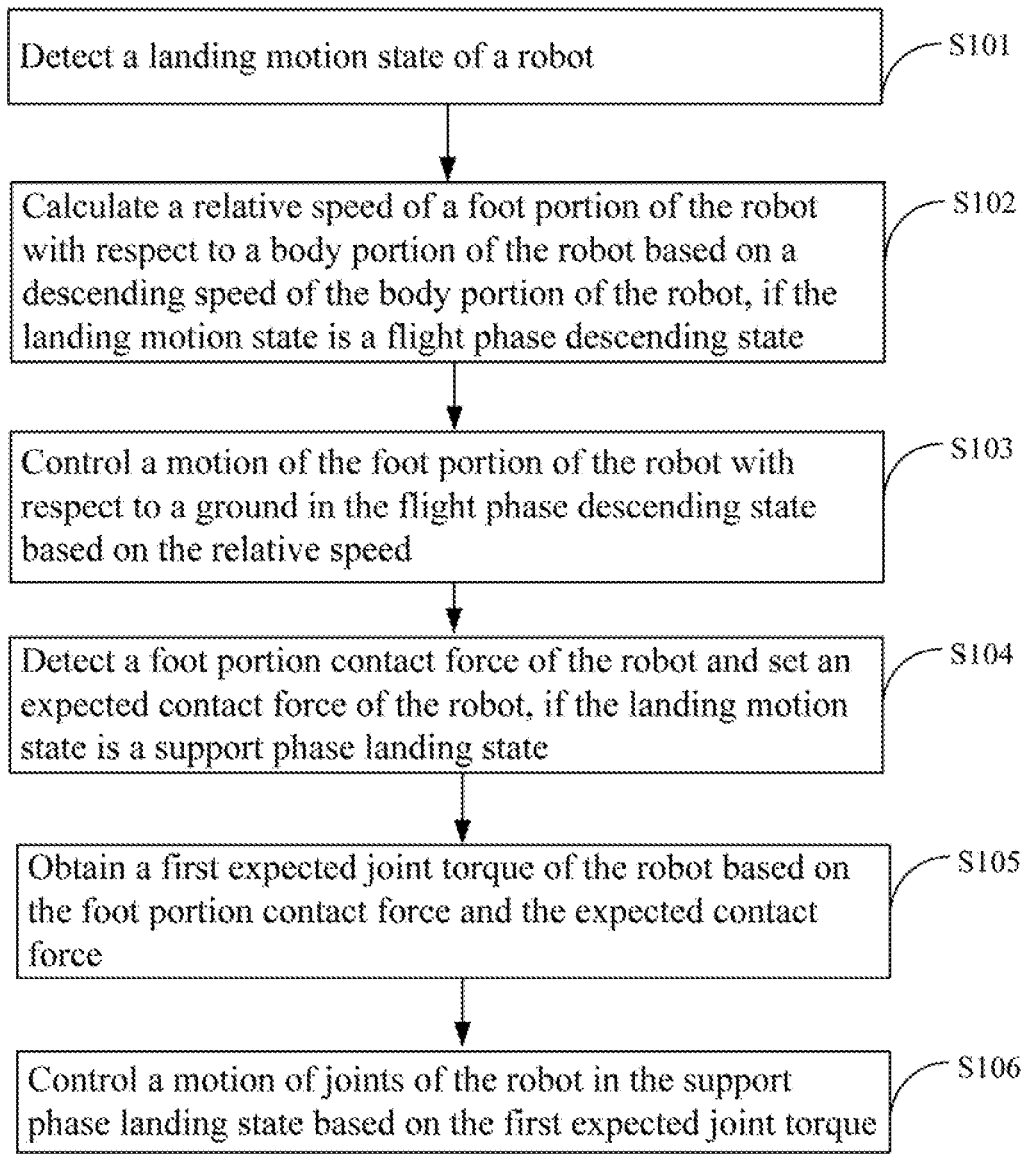
FIG. 1 is a flow chart of a footed robot landing control method according to an embodiment of the present disclosure.

FIG. 1 is a flow chart of a footed robot landing control method according to an embodiment of the present disclosure. In this embodiment, the method is a computer-implemented method executable for a processor. The footed robot landing control method of this embodiment can be applied to a footed robot which may be but not limited to a four-legged, six-legged, and eight-footed robot, where the robot can be equipped with sensors, such as torque sensors, infrared sensors, ultrasound sensors, or laser sensors. As shown in FIG. 1, the method includes the following steps.

S101: detecting a landing motion state of the robot.

Figure 2:
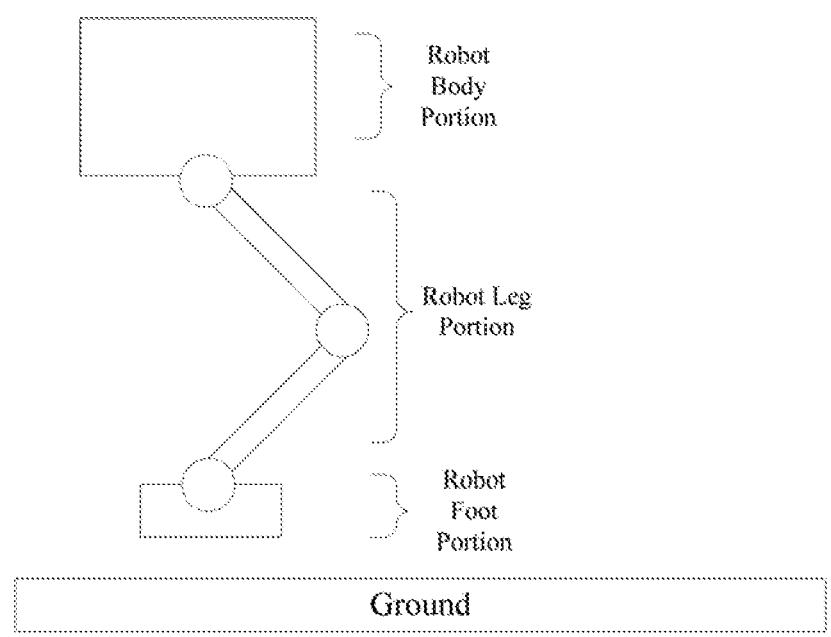
FIG. 2 is a schematic block diagram of a foot-type robot in a flight phase descending state according to the embodiment of the present disclosure.
Figure 3:
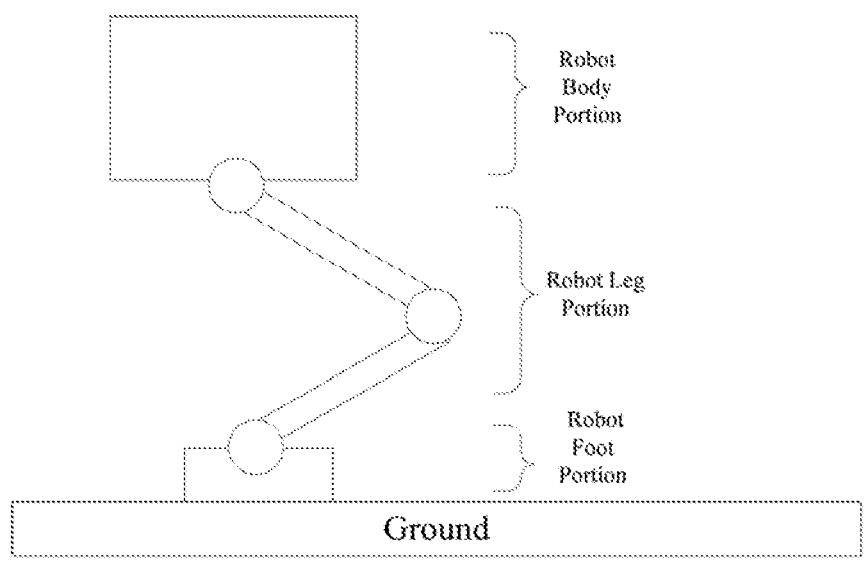
FIG. 3 is a schematic block diagram of a foot-type robot in a support phase landing state according to the embodiment of the present disclosure.

In this embodiment, a landing motion state in the landing process of the footed robot can be divided into a flight phase descending state and a support phase landing state, in which the flight phase descending state is a state that the footed robot is descended for the coming landing, and the support phase landing state is a state that the footed robot has been landed. FIG. 2 is a schematic block diagram of a foot-type robot in a flight phase descending state according to this embodiment; FIG. 3 is a schematic block diagram of a foot-type robot in a support phase landing state according to the embodiment of the present disclosure. Specifically, the landing motion state of the robot can be determined based on the acceleration of the robot.

S102: calculating a relative speed of a foot portion of the robot with respect to a body portion of the robot based on a descending speed of the body portion of the robot, if the landing motion state is a flight phase descending state.

Figure 4:
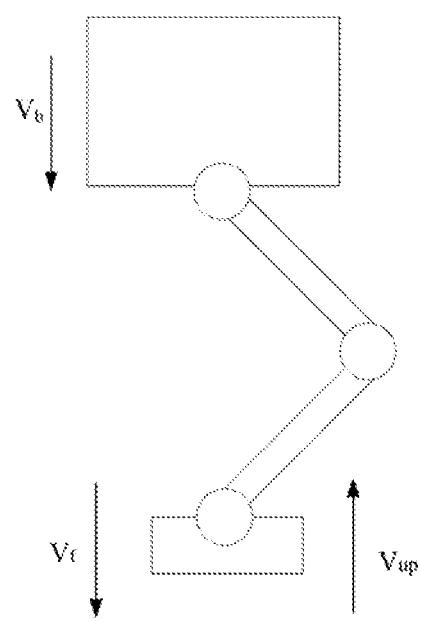
FIG. 4 is a schematic block diagram of the motion of a body portion and a foot portion of a footed robot according to the embodiment of the present disclosure.

FIG. 4 is a schematic block diagram of the motion of a body portion and a foot portion of a footed robot according to the embodiment of the present disclosure. As shown in FIG. 4, in this embodiment, the descending speed of the body portion with respect to the ground is Vb, where Vb=gt, g indicates the gravity acceleration, t indicates the phase time of the flight phase descending state; the relative speed of the foot portion with respect to the body portion is Vup, where Vup=at, a indicates the relative acceleration of the foot portion with respect to the body portion, t indicates the phase time of the flight phase descending state. The speed of the foot portion with respect to the ground is Vf, where Vf=Vb+Vup.

S103: controlling a motion of the foot portion of the robot with respect to a ground in the flight phase descending state based on the relative speed.

Figure 5:
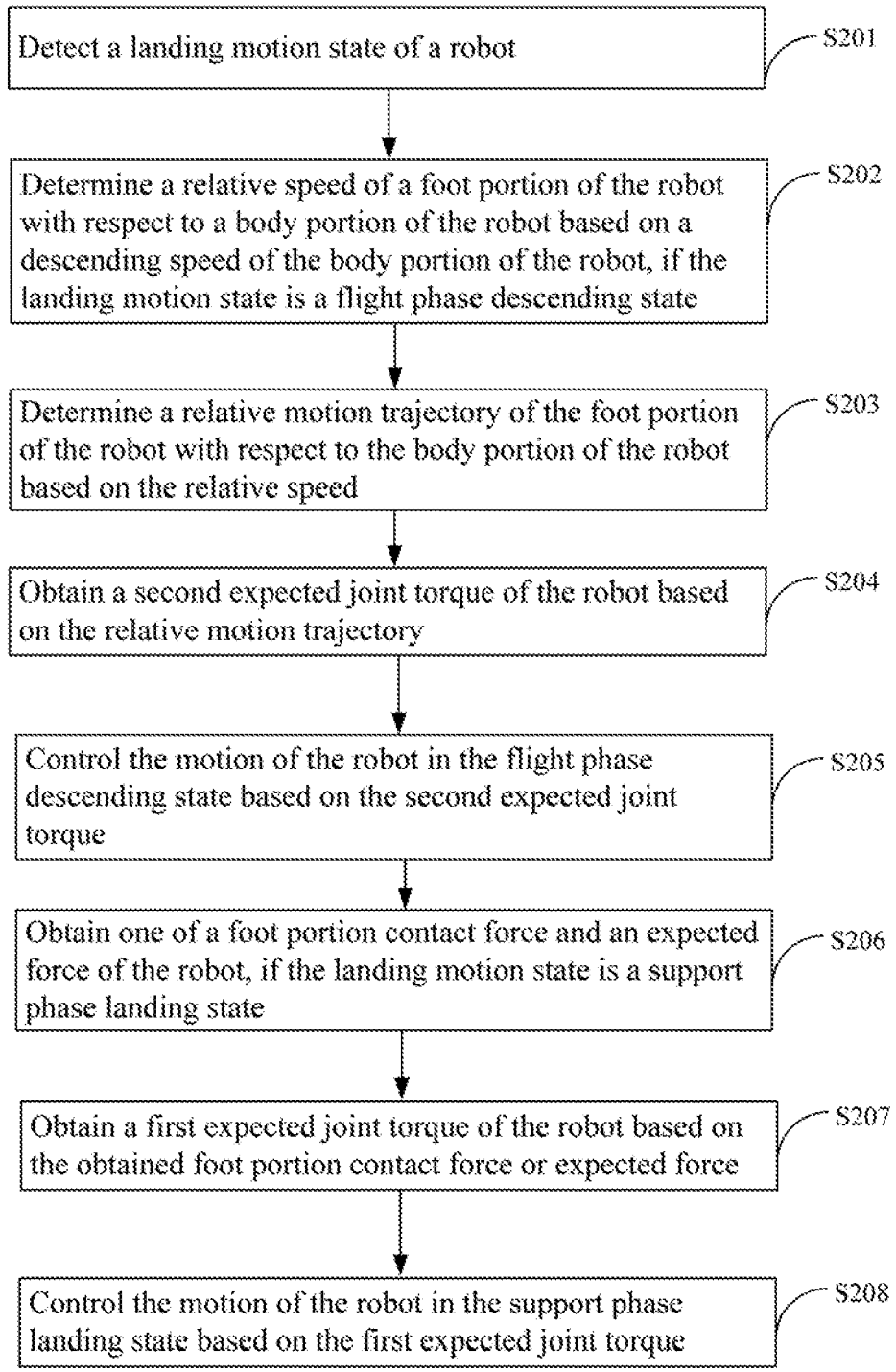
FIG. 5 is a flow chart of a footed robot landing control method according to another embodiment of the present disclosure.

In this embodiment, the relative motion trajectory of the foot portion is determined based on the relative speed, and the motion of the robot in the flight phase descending state is controlled based on the relative motion trajectory (see FIG. 5).

S104: detecting a foot portion contact force of the robot and setting an expected contact force of the robot, if the landing motion state is a support phase landing state.

In this embodiment, the foot portion contact force of the robot may be directly detected, or be obtained by measuring a joint torque of the robot first and obtaining the foot portion contact force through the joint torque. The expected contact force is the expected force that the foot portion contacts the ground.

S105: obtaining a first expected joint torque of the robot based on the foot portion contact force and the expected contact force.

In this embodiment, the foot portion contact force may be obtained through a six-dimensional torque sensor, or be obtained by obtaining the joint torque of the robot through a one-dimensional torque sensor and determining the foot portion contact force of the robot based on the joint torque. The expected contact force of the robot can be obtained by calculating based on a spring damping formula (see FIG. 6 and FIG. 7).

S106: controlling a motion of joints of the robot in the support phase landing state based on the first expected joint torque.

In this embodiment, the motion of the joints of the robot in the support phase landing state is implemented by the execution mechanism (e.g., hand, wrist, waist, and base) of the robot based on the first expected joint torque.

As shown in FIG. 4, based on the momentum theorem, it can be known that $mV_f=m(V_b-V_{up}) \leq mV_b$, in which the impact of the foot portion against the ground is reduced, and the purpose of reducing the impact can be achieved.

It can be seen from this embodiment that, the landing motion state of the robot is detected. If the landing motion state is the flight phase descending state, the relative speed of the foot portion with respect to the body portion is determined based on the descending speed of the body portion. The motion of the robot in the flight phase descending state is controlled based on the relative speed. If the landing motion state is the support phase landing state, the foot portion contact force and the expected contact force of the robot is obtained. The first expected joint torque of the robot is obtained based on the foot portion contact force and the expected contact force. The motion of the robot in the support phase landing state is controlled based on the first expected joint torque, which can reduce the impact of the foot portion against the ground, thereby realizing the flexible control of the landing process of the footed robot in a simple and rapid manner and reducing the cost of the footed robot.

FIG. 5 is a flow chart of a footed robot landing control method according to another embodiment of the present disclosure. As shown in FIG. 5, based on the above-mentioned embodiment, this embodiment details the process of controlling the motion of the robot in the flight phase descending state based on the relative speed, which is described in detail as follows.

The contents of S201-S202 are consistent with the contents of S101-S102. For details, refer to related descriptions of S101-S102, which are not described herein.

S203: determining a relative motion trajectory of the foot portion of the robot with respect to the body portion of the robot based on the relative speed.

In this embodiment, the relative motion trajectory of the robot foot portion is $y=\frac{1}{2}at^2$, where a indicates the relative acceleration of the foot portion with respect to the robot body, and t indicates the phase time of the flight phase descending state.

S204: obtaining a second expected joint torque of the robot based on the relative motion trajectory.

In this embodiment, a robot leg control dynamics equation of $A(\theta)\ddot{\theta}+B(\theta,\dot{\theta})\dot{\theta}+N(\theta,\dot{\theta})=\tau+J^T$ is used, where A indicates a inertia matrix, B indicates a Coriolis force and centrifugal force term matrix, N indicates a gravity term matrix, $\theta$ indicates a joint angle vector, J indicates a Jacobian matrix, and F indicates an external force. The relative motion trajectory is substituted into the robot leg control dynamics equation, thereby calculating the second expected joint torque.

S205: controlling the motion of the robot in the flight phase descending state based on the second expected joint torque.

The contents of S206-S208 are consistent with the contents of S104-S106. For details, refer to related descriptions of S104-S106, which are not described herein.

It can be seen from this embodiment that, the relative motion trajectory of the foot portion is determined through the acceleration of the robot, and the second expected joint torque of the robot is obtained based on the relative motion trajectory, and then the motion of the robot in the flight phase descending state is controlled based on the second expected joint torque, which is capable of realizing the flexible control of the motion of the robot in the flight phase descending state.

Figure 6:
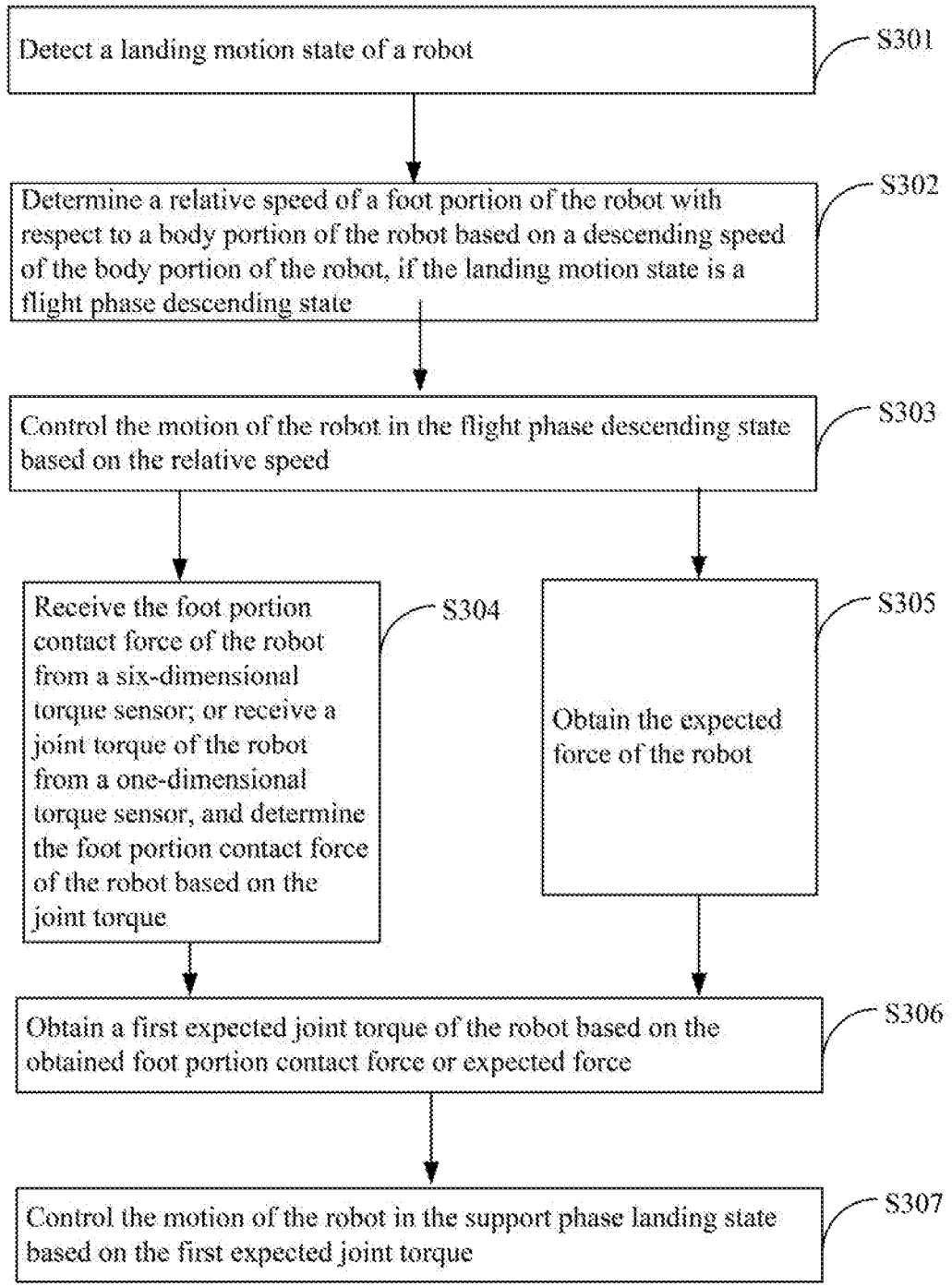
FIG. 6 is a flow chart of a footed robot landing control method according to still another embodiment of the present disclosure.

FIG. 6 is a flow chart of a footed robot landing control method according to still another embodiment of the present disclosure. As shown in FIG. 6, based on the above-mentioned embodiment, the process of detecting the foot portion contact force and setting the expected contact force of the robot in the above-mentioned step S104 includes the following steps.

The contents of S301-S303 are consistent with the contents of S101-S103. For details, refer to related descriptions of S101-S103, which are not described herein.

S304: receiving the foot portion contact force of the robot from a six-dimensional torque sensor; or receiving a joint torque of the robot from a one-dimensional torque sensor, and determining the foot portion contact force of the robot based on the joint torque.

S305: obtaining the expected contact force of the robot.

In which, the calculation formula for obtaining the expected contact force of the robot is:

$$F=k(l-l_0);$$

where, F indicates the expected contact force of the robot, k indicates the rigidity coefficient, l indicates the leg length of the robot, and $l_0$ indicates the free length of the leg length of the robot.

Figure 7:
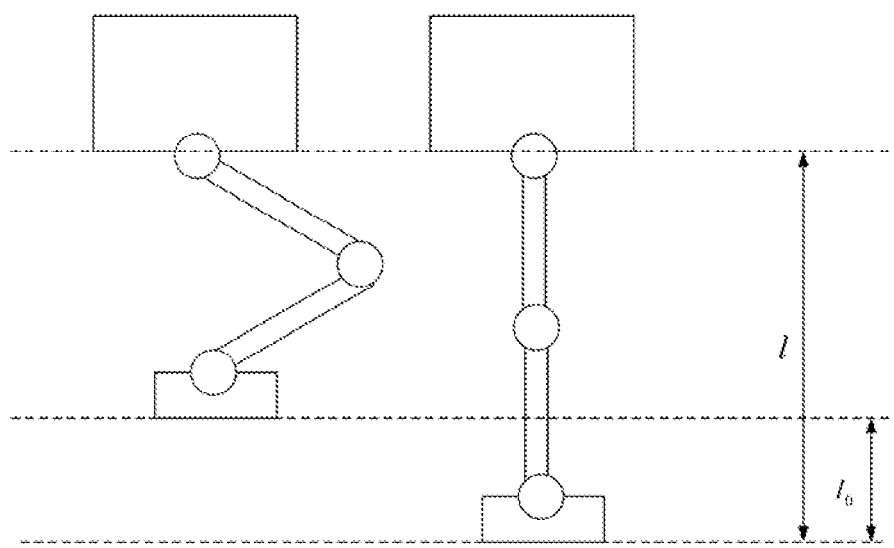
FIG. 7 is a schematic block diagram of a leg length and a free length of the leg length of the robot according to the embodiment of the present disclosure.

FIG. 7 is a schematic block diagram of a leg length and a free length of the leg length of the robot according to the embodiment of the present disclosure. As shown in FIG. 7, an impedance control method is used to equivalent the leg of the robot to a spring, where l indicates the length of the leg of the robot, $l_0$ indicates the free length of the leg length of the robot.

The contents of S306-S307 are consistent with the contents of S105-S106. For details, refer to related descriptions of S105-S106, which are not described herein.

It can be seen from this embodiment that, by directly detecting the foot portion contact force of the robot, detecting the joint torque and determining the foot portion contact force of the robot based on the joint torque, or using the impedance control method to obtain the expected contact force of the robot, the obtaining of the first expected joint torque of the robot is realized in a plurality of methods through the foot portion contact force and the expected contact force.

In one embodiment of the present disclosure, if the landing motion state of the robot is neither the flight phase descending state nor the support phase landing state, the process of detecting the landing motion state of the robot is re-executed (i.e., returning to step S101). The flexible control of the landing process of the robot is realized by re-detecting the process of the landing motion state of the robot until it is detected that the landing motion state of the robot is the flight phase descending state or the support phase landing state.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 8:
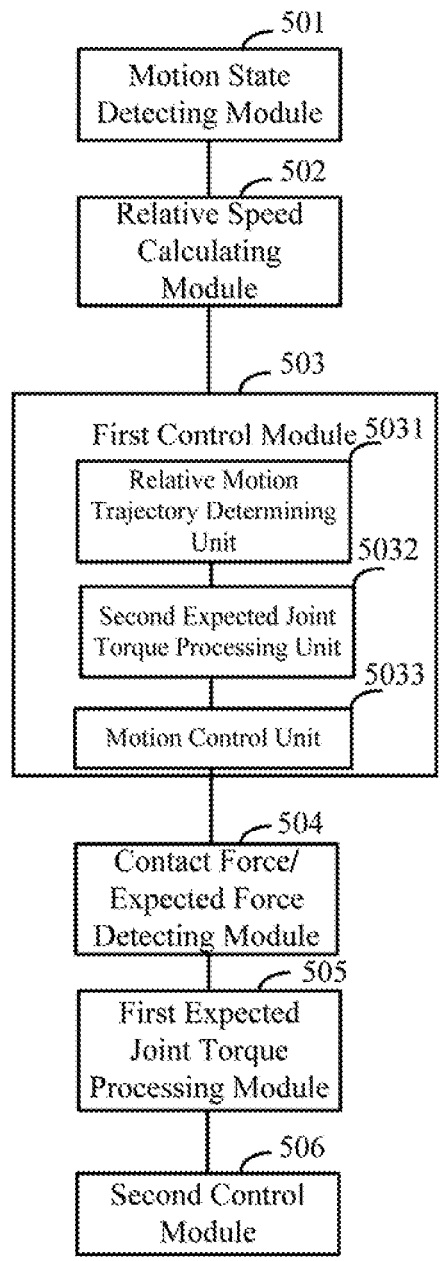
FIG. 8 is a schematic block diagram of a footed robot landing control device according to an embodiment of the present disclosure.

FIG. 8 is a schematic block diagram of a footed robot landing control device according to an embodiment of the present disclosure. The footed robot landing control device is corresponded to the footed robot landing control method of the above-mentioned embodiment. For the convenience of description, only parts related to this embodiment are shown. As shown in FIG. 8, a footed robot landing control device includes a motion state detecting module 501, a relative speed calculating module 502, a first control module 503, a contact force/expected force obtaining module 504, a first expected joint torque processing module 505, and a second control module 506.

In which, the motion state detecting module 501 is configured to detect a landing motion state of the robot;

the relative speed calculating module 502 is configured to determine a relative speed of a foot portion of the robot with respect to a body portion of the robot based on a descending speed of the body portion of the robot, if the landing motion state is a flight phase descending state;

the first control module 503 is configured to control the motion of the robot in the flight phase descending state based on the relative speed;

the contact force/expected force obtaining module 504 is configured to detect a foot portion contact force and set an expected contact force of the robot, if the landing motion state is a support phase landing state;

the first expected joint torque processing module 505 is configured to obtain a first expected joint torque of the robot based on the foot portion contact force and the expected contact force; and the second control module 506 is configured to control the motion of the robot in the support phase landing state based on the first expected joint torque.

It can be seen from this embodiment that, the landing motion state of the robot is detected. If the landing motion state is the flight phase descending state, the relative speed of the foot portion with respect to the body portion is determined based on the descending speed of the body portion. The motion of the robot in the flight phase descending state is controlled based on the relative speed. If the landing motion state is the support phase landing state, the foot portion contact force and the expected contact force of the robot is obtained. The first expected joint torque of the robot is obtained based on the foot portion contact force and the expected contact force. The motion of the robot in the support phase landing state is controlled based on the first expected joint torque, which can reduce the impact of the foot portion against the ground, thereby realizing the flexible control of the landing process of the footed robot in a simple and rapid manner and reducing the cost of the footed robot.

As shown in FIG. 8, in an embodiment of the present disclosure, based on the above-mentioned embodiment, the first control module 503 includes:

a relative motion trajectory determining unit 5031 configured to determine a relative motion trajectory of the foot portion of the robot based on the relative speed;

a second expected joint torque processing unit 5032 configured to obtain a second expected joint torque of the robot based on the relative motion trajectory; and a motion control unit 5033 configured to control the motion of the robot in the flight phase descending state based on the second expected joint torque.

As shown in FIG. 8, in an embodiment of the present disclosure, based on the above-mentioned embodiment, the contact force/expected force obtaining module 504 is configured to receive the foot portion contact force of the robot from a six-dimensional torque sensor; or receive a joint torque of the robot from a one-dimensional torque sensor, and determine the foot portion contact force of the robot based on the joint torque.

As shown in FIG. 8, in an embodiment of the present disclosure, based on the above-mentioned embodiment, the contact force/expected force obtaining module 504 is configured to obtain the expected force of the robot by calculating the expected force of the robot through the following formula:

$$F=k(l-l_0);$$

where, F is the expected force of the robot, k is a rigidity coefficient, l is a leg length of the robot, and $l_0$ is a free length of the leg length of the robot.

As shown in FIG. 8, in an embodiment of the present disclosure, based on the above-mentioned embodiment, the motion state detecting module 501 is further configured to re-execute the process of detecting the landing motion state of the robot, if the landing motion state is neither the flight phase descending state nor the support phase landing state.

Figure 9:
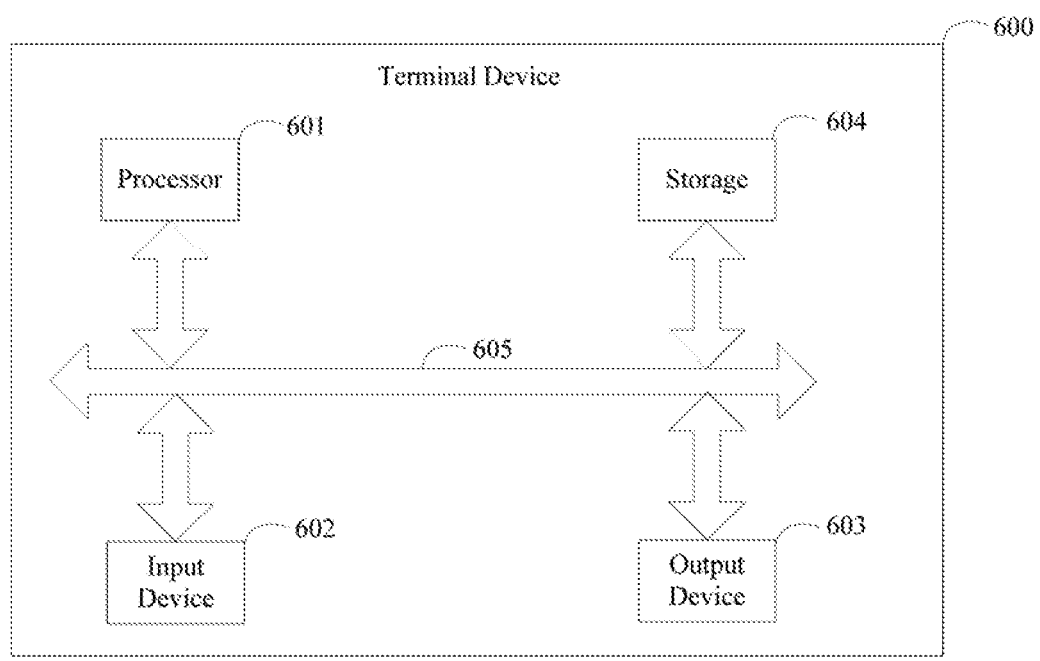
FIG. 9 is a schematic block diagram of a footed robot landing control terminal device according to an embodiment of the present disclosure.

FIG. 9 is a schematic block diagram of a footed robot landing control terminal device according to an embodiment of the present disclosure. As shown in FIG. 9, a terminal device 600 may include one or more processors 601, one or more input devices 602, one or more output devices 603, and one or more storages 604. The above-mentioned processor 601, input device 602, output device 603, and storage 604 perform communication with each other via a communication bus 605. The storage 604 is configured to store computer program(s) including program instruction(s). The processor 601 is configured to execute program instructions stored in the storage 604. In which, the processor 601 is configured to invoke the program instruction(s) to perform operations.

The processor 601 is configured to detect a landing motion state of the robot; calculate a relative speed of a foot portion of the robot with respect to a body portion of the robot based on a descending speed of the body portion of the robot, if the landing motion state is a flight phase descending state; control the motion of the robot in the flight phase descending state based on the relative speed; detect a foot portion contact force and set an expected contact force of the robot, if the landing motion state is a support phase landing state; obtain a first expected joint torque of the robot based on the foot portion contact force and the expected contact force; and control the motion of the robot in the support phase landing state based on the first expected joint torque.

Furthermore, the processor 601 is further configured to: to control the motion of the robot in the flight phase descending state based on the relative speed by: determining a relative motion trajectory of the foot portion of the robot based on the relative speed; obtaining a second expected joint torque of the robot based on the relative motion trajectory; and controlling the motion of the robot in the flight phase descending state based on the second expected joint torque.

Furthermore, the processor 601 is further configured to: to obtain the foot portion contact force of the robot by: receiving the foot portion contact force of the robot from a six-dimensional torque sensor; or receiving a joint torque of the robot from a one-dimensional torque sensor, and determining the foot portion contact force of the robot based on the joint torque.

Furthermore, the processor 601 is further configured to obtain the expected force of the robot by calculating the expected force of the robot through the formula of $F=k(l-l_0)$, where F is the expected force of the robot, k is a rigidity coefficient, l is a leg length of the robot, and $l_0$ is a free length of the leg length of the robot.

Furthermore, the processor 601 is further configured to re-execute the process of detecting the landing motion state of the robot, if the landing motion state is neither the flight phase descending state nor the support phase landing state.

It should be understood that, in this embodiment, the processor 601 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 602 may include a touch panel, a fingerprint sensor (for collecting fingerprint information and fingerprint direction information of a user), a microphone, and the like. The output device 603 may include a display (e.g., LCD), a speaker, and the like.

The storage 604 may include a read only memory and a random access memory, which provides instructions and data to the processor 601. A portion of the storage 604 may also include a non-volatile random access memory. The storage 604 may also store device type information.

In a specific implementation, the processor 601, the input device 602, and the output device 603 which are described in this embodiment may implement the footed robot landing control method provided by the embodiments of the present disclosure, and may implement the terminal described in the embodiments of the present disclosure, which are not described herein.

In another embodiment of the present disclosure, a computer readable storage medium is provided. The computer readable storage medium is stored with a computer program. The computer program includes program instructions. The program instructions implement all or part of the processes in the method for implementing the above-mentioned embodiments of the present disclosure while being executed by a processor, and may also implement by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The computer readable storage medium may be an internal storage unit of the device of the above-mentioned embodiments, for example, a hard disk or a memory of the device. The computer readable storage medium may also be an external storage device of the device, for example, a plug-in hard disk, a smart media card (SMC), a secure digital (SD) card, flash card, and the like, which is equipped on the device. Furthermore, the computer readable storage medium may further include both an internal storage unit and an external storage device, of the device. The computer readable storage medium is configured to store the computer program and other programs and data required by the device. The computer readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of both. To clearly illustrate the interchangeability of hardware and software, the components and steps of each embodiment have been generally described in terms of functionality in the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the above-mentioned specific operation process of the device and the units, reference may be made to the corresponding processes in the above-mentioned method embodiments, and are not described herein.

In the embodiments provided by the present disclosure, it should be understood that the disclosed device and method may be implemented in other manners. For example, the above-mentioned device embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, the functional units in the embodiments of the present disclosure may be integrated in one processing unit, or each unit may exist alone physically, or two or more units may be integrated in one unit. The above-mentioned integrated unit may be implemented in the form of hardware or in the form of software functional unit.

The foregoing is merely embodiments of the present disclosure, and is not intended to limit the scope of the present disclosure. Any equivalent modifications or substitutions which can be easily conceived by those skilled in the art based on the technical scope of the present disclosure shall all be within the scope of the present disclosure. Therefore, the scope of the present disclosure should be determined by the scope of the claims.

What is claimed is:

1. A computer-implemented footed robot landing control method for a robot, comprising:
   providing a footed robot landing control terminal device comprising a processor;
   detecting, by the processor, a landing motion state of the robot;
   calculating a relative speed of a foot portion of the robot with respect to a body portion of the robot based on a descending speed of the body portion of the robot, in response to the landing motion state being a flight phase descending state;
   controlling a motion of the foot portion of the robot with respect to a ground in the flight phase descending state based on the relative speed;
   detecting a foot portion contact force of the robot and setting an expected contact force of the robot, in response to the landing motion state being a support phase landing state;
   obtaining a first expected joint torque of the robot based on the foot portion contact force and the expected contact force; and
   controlling a motion of one or more joints of the robot in the support phase landing state based on the first expected joint torque.

2. The method of claim 1, wherein the step of controlling the motion of the foot portion of the robot with respect to the ground in the flight phase descending state based on the relative speed comprises:
   determining a relative motion trajectory of the foot portion of the robot with respect to the body portion of the robot based on the relative speed;
   obtaining a second expected joint torque of the robot based on the relative motion trajectory; and
   controlling the motion of the robot in the flight phase descending state based on the second expected joint torque.

3. The method of claim 1, wherein the step of detecting the foot portion contact force of the robot comprises:
   receiving the foot portion contact force of the robot from a six-dimensional torque sensor; or
   receiving a joint torque of the robot from a one-dimensional torque sensor, and determining the foot portion contact force of the robot based on the joint torque.

4. The method of claim 1, wherein the step of setting the expected contact force of the robot comprises calculating the expected contact force of the robot through the following formula:

$$F=k(l-l_0);$$

wherein, F is the expected contact force of the robot, k is a rigidity coefficient, l is a leg length of the robot, and $l_0$ is a free length of the leg length of the robot.

5. The method of claim 1, further comprising:
   returning to the step of detecting the landing motion state of the robot, in response to the landing motion state being neither the flight phase descending state nor the support phase landing state.

6. The method of claim 1, wherein the processor is electrically coupled to an acceleration sensor of the robot, and the landing motion state of the robot is determined based on acceleration of the robot obtained by the acceleration sensor of the robot.

7. A footed robot landing control device, comprising:
   a motion state detecting module configured to detect a landing motion state of the robot;
   a relative speed calculating module configured to calculate a relative speed of a foot portion of the robot with respect to a body portion of the robot based on a descending speed of the body portion of the robot, in response to the landing motion state being a flight phase descending state;
   a first control module configured to control a motion of the foot portion of the robot with respect to a ground in the flight phase descending state based on the relative speed;
   a contact force/expected force detecting module configured to detect a foot portion contact force of the robot and setting an expected contact force of the robot, in response to the landing motion state being a support phase landing state;
   a first expected joint torque processing module configured to obtain a first expected joint torque of the robot based on the foot portion contact force and the expected contact force; and a second control module configured to control a motion of one or more joints of the robot in the support phase landing state based on the first expected joint torque.

8. The device of claim 7, wherein the first control module comprises:
a relative motion trajectory determining unit configured to determine a relative motion trajectory of the foot portion of the robot with respect to the body portion of the robot based on the relative speed;
a second expected joint torque processing unit configured to obtain a second expected joint torque of the robot based on the relative motion trajectory; and
a motion control unit configured to control the motion of the robot in the flight phase descending state based on the second expected joint torque.

9. The device of claim 7, wherein the contact force/expected force obtaining module is configured to:
receive the foot portion contact force of the robot from a six-dimensional torque sensor; or
receive a joint torque of the robot from a one-dimensional torque sensor, and determine the foot portion contact force of the robot based on the joint torque.

10. The device of claim 7, wherein the contact force/expected force obtaining module is configured to calculate the expected contact force of the robot through the following formula:

$$F=k(l-l_0);$$

wherein, F is the expected contact force of the robot, k is a rigidity coefficient, l is a leg length of the robot, and $l_0$ is a free length of the leg length of the robot.

11. The device of claim 7, wherein the motion state detecting module is further configured to return to the step of detecting the landing motion state of the robot, in response to the landing motion state being neither the flight phase descending state nor the support phase landing state.

12. A footed robot landing control terminal device, comprising a memory, one or more processors, and one or more computer program, wherein the one or more computer programs are stored in the memory and configured to be executed by the one or more processors, the one or more programs comprise:
instructions for detecting a landing motion state of the robot;
instructions for calculating a relative speed of a foot portion of the robot with respect to a body portion of the robot based on a descending speed of the body portion of the robot, in response to the landing motion state being a flight phase descending state;
instructions for controlling a motion of the foot portion of the robot with respect to a ground in the flight phase descending state based on the relative speed;
instructions for detecting a foot portion contact force of the robot and setting an expected contact force of the robot, in response to the landing motion state being a support phase landing state;
instructions for obtaining a first expected joint torque of the robot based on the foot portion contact force and the expected contact force; and
instructions for controlling a motion of one or more joints of the robot in the support phase landing state based on the first expected joint torque.

13. The terminal device of claim 12, wherein the instructions for controlling the motion of the foot portion of the robot with respect to the ground in the flight phase descending state based on the relative speed comprise:
instructions for determining a relative motion trajectory of the foot portion of the robot with respect to the body portion of the robot based on the relative speed;
instructions for obtaining a second expected joint torque of the robot based on the relative motion trajectory; and
instructions for controlling the motion of the robot in the flight phase descending state based on the second expected joint torque.

14. The terminal device of claim 12, wherein the instructions for detecting the foot portion contact force of the robot comprise:
instructions for receiving the foot portion contact force of the robot from a six-dimensional torque sensor; or
instructions for receiving a joint torque of the robot from a one-dimensional torque sensor, and determining the foot portion contact force of the robot based on the joint torque.

15. The terminal device of claim 12, wherein the instructions for obtaining the expected contact force of the robot comprise instructions for calculating the expected contact force of the robot through the following formula:

$$F=k(l-l_0);$$

wherein, F is the expected contact force of the robot, k is a rigidity coefficient, l is a leg length of the robot, and $l_0$ is a free length of the leg length of the robot.

16. The terminal device of claim 12, wherein the one or more programs further comprise:
instructions for returning to the step of detecting the landing motion state of the robot, in response to the landing motion state being neither the flight phase descending state nor the support phase landing state.

* * * * *